(12) United States Patent
Sakai et al.

(10) Patent No.: US 8,549,916 B2
(45) Date of Patent: Oct. 8, 2013

(54) ANGULAR VELOCITY SENSOR

(75) Inventors: Minekazu Sakai, Kariya (JP); Kenichi Ao, Tokai (JP)

(73) Assignee: DENSO CORPORATION, Kariya (JP)

( * ) Notice: Subject to any disclaimer, the term of this patent is extended or adjusted under 35 U.S.C. 154(b) by 357 days.

(21) Appl. No.: 13/093,328

(22) Filed: Apr. 25, 2011

(65) Prior Publication Data

US 2011/0271758 A1 Nov. 10, 2011

(30) Foreign Application Priority Data

May 10, 2010 (JP) .................................. 2010-108605

(51) Int. Cl.
*G01C 19/56* (2012.01)
(52) U.S. Cl.
USPC ...................................................... 73/504.12
(58) Field of Classification Search
USPC ......................................... 73/504.12, 504.14
See application file for complete search history.

(56) References Cited

U.S. PATENT DOCUMENTS

| 5,969,225 | A | 10/1999 | Kobayashi |
| 6,473,290 | B2 | 10/2002 | Mochida |
| 2001/0015101 | A1 | 8/2001 | Iwaki et al. |
| 2003/0183007 | A1 | 10/2003 | Willig et al. |
| 2007/0131030 | A1 | 6/2007 | Jeong et al. |

FOREIGN PATENT DOCUMENTS

| JP | A-2002-188923 | 7/2002 |
| JP | A-2008-014727 | 1/2008 |

*Primary Examiner* — John Chapman, Jr.
(74) *Attorney, Agent, or Firm* — Posz Law Group, PLC

(57) ABSTRACT

In an angular velocity sensor, a beam portion couples a pair of vibrators with each other and couples each of the vibrators to a substrate to enable the pair of vibrators to be movable in a first direction and a second direction that are perpendicular to each other. The driving portion vibrates the pair of vibrators in opposite phases in the first direction. The detecting portion detects displacement of the pair of vibrators in the second direction as a change in capacitance. The detecting portion includes first and second detecting electrodes. The restricting portion restricts displacement of the pair of vibrators in the second direction based on the change in capacitance. The restricting portion includes first and second restricting electrodes, and an electrode interval between the restricting electrodes is twice a width of the detecting electrodes in the second direction.

5 Claims, 4 Drawing Sheets

ANGULAR VELOCITY SENSOR

CROSS REFERENCE TO RELATED APPLICATIONS

The present application is based on and claims priority to Japanese Patent Application No. 2010-108605 filed on May 10, 2010, the contents of which are incorporated in their entirety herein by reference.

BACKGROUND OF THE INVENTION

1. Field of the Invention

The present invention relates to an angular velocity sensor.

2. Description of the Related Art

Japanese Patent No. 3,606,164 (corresponding to U.S. Pat. No. 6,473,290, referred to as the patent document 1 hereafter) discloses an angular velocity sensor that includes a substrate, a movable unit coupled with the substrate through a supporting beam, a comb-shaped movable electrode provided in the movable unit, and a comb-shaped fixed electrode provided in the substrate. The movable unit is movable in a detecting direction due to the supporting beam. The comb-shaped fixed electrode includes a plurality of fixed electrode units arranged in the second direction at predetermined intervals. The comb-shaped movable part includes a plurality of movable electrode units. The movable electrode units are engaged with the fixed electrode unit in such a manner that one of the movable electrode units is arranged between adjacent two of the fixed electrode units. The angular velocity sensor detects angular velocity by detecting a change in capacitance of a capacitor provided by the fixed electrode units and the movable electrode units when the movable unit is displaced in the second direction due to Coriolis force along the second direction.

Japanese Patent No. 3,512,004 (referred to as the patent document 2 hereafter) discloses an angular velocity sensor that includes a substrate, a vibrator coupled with the substrate through a beam and a frame, a servo electrode, and a servo control circuit. The vibrator is movable in a first direction and a second direction that are parallel to a surface of the substrate and are perpendicular to each other. The servo electrode and the servo control circuit restrict vibration of the vibrator in the second direction. The angular velocity sensor calculates a servo voltage applied to the servo electrode based on the vibration of the vibrator in the second direction and calculates the angular velocity based on the servo voltage.

Each of the above-described angular velocity sensors is manufactured by processing a silicon-on-insulator (SOI) substrate by a known micromachine technique. In such processing, machining error occurs in some measure. When machining error occurs, the vibration in the first direction may escape in the second direction, and an escaped component may reduce a detection accuracy of angular velocity. The angular velocity sensor disclosed in the patent document 1 does not have a configuration for restricting influence of the escaped component. Thus, the detection accuracy of angular velocity may be reduced by the escaped component.

In the angular velocity sensor disclosed in the patent document 2, the servo electrode and the servo control circuit restrict vibration of the vibrator in the second direction. Thus, influence of the escaped component can be reduced.

However, in the angular velocity sensor disclosed in the patent document 2, if machining error occurs in interval and width of electrodes, a servo voltage change with respect to an angular velocity change may be reduced in the servo electrode and the servo control circuit. As a result, the detection accuracy of angular velocity may be reduced.

SUMMARY OF THE INVENTION

In view of the foregoing problems, it is an object of the present invention to provide an angular velocity sensor that can restrict a decrease in a servo voltage change with respect to an angular velocity change due to machining error.

An angular velocity sensor according to an aspect of the present invention includes a substrate, a pair of vibrators, a beam portion, a driving portion, a detecting portion, and a restricting portion. The beam portion couples the pair of vibrators with each other and couples each of the pair of vibrators to the substrate to enable the pair of vibrators to be movable in a first direction and a second direction that are perpendicular to each other. The driving portion vibrates the pair of vibrators in opposite phases in the first direction. The driving portion includes a first driving electrode disposed on each of the pair of vibrators and a second driving electrode disposed on the substrate. The first driving electrode and the second driving electrode are located opposite to each other in the second direction. The detecting portion detects displacement of the pair of vibrators in the second direction as a change in capacitance. The displacement of the pair of vibrators in the second direction is caused by Coriolis force generated in the pair of vibrators due to vibration of the pair of vibrators and angular velocity around a third direction that is perpendicular to the first direction and the second direction. The detecting portion includes a first detecting electrode disposed on each of the pair of vibrators and a second detecting electrode disposed on the substrate. The first detecting electrode and the second detecting electrode are located opposite to each other in the second direction. The restricting portion restricts displacement of each of the pair of vibrators in the second direction based on the change in capacitance. The restricting portion includes a first restricting electrode disposed on each of the pair of vibrators and a second restricting electrode disposed on the substrate. The first restricting electrode and the second restricting electrode are located opposite to each other in the second direction. The first driving electrode, the second driving electrode, the first detecting electrode, the second detecting electrode, the first restricting electrode, and the second restricting electrode have the same thickness in the third direction. The first detecting electrode includes a first opposing portion located opposite to the second detecting electrode, the second detecting electrode includes a second opposing portion located opposite to the first detecting electrode, and the first opposing portion and the second opposing portion have a same width in the second direction. The first restricting electrode is located at an electrode interval from the second restricting electrode in the second direction, and the electrode interval is twice the width of each of the first opposing portion and the second opposing portion.

The angular velocity sensor can restrict a decrease in a servo voltage change with respect to an angular velocity change due to machining error. Thus, the angular velocity sensor can have a high detection accuracy.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

An angular velocity sensor 100 according to an embodiment of the present invention will be described with reference to drawings.

Figure 1:
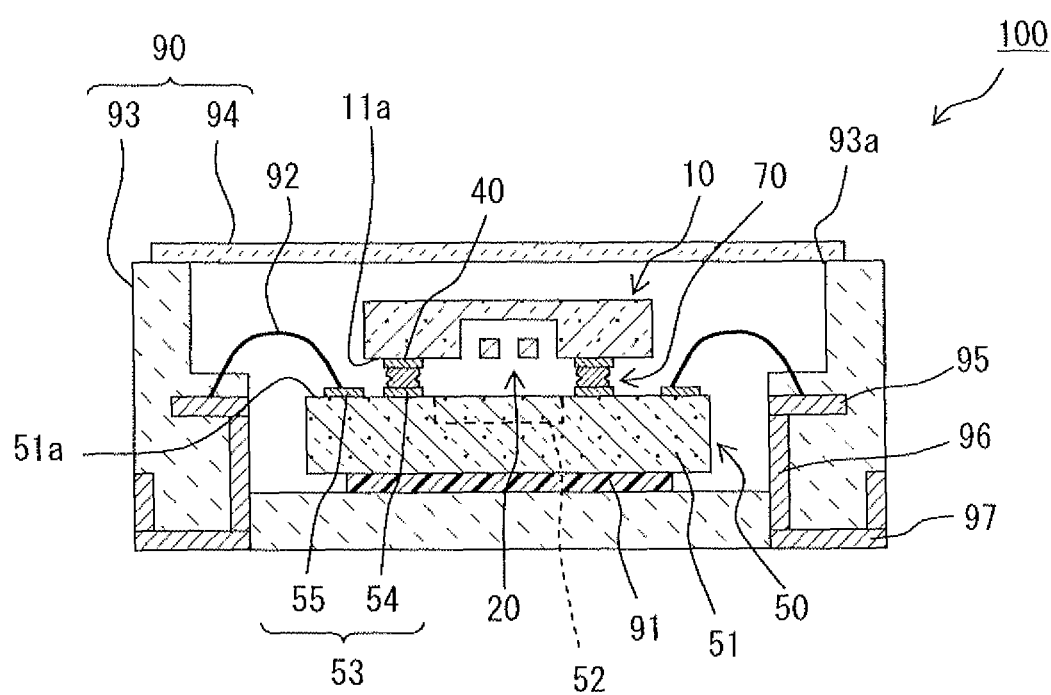
FIG. 1 is a cross-sectional view showing an angular velocity sensor according to an embodiment of the present invention.

As shown in FIG. 1, the angular velocity sensor 100 includes a sensor chip 10, a circuit chip 50, a plurality of bumps 70, and a package 90. The sensor chip 10 and the circuit chip 50 are mechanically and electrically coupled with each other through the bumps 70. The circuit chip 50 and the package 90 are mechanically coupled with each other through an adhesive 91. The circuit chip 50 and the package 90 are electrically coupled with each other through wires 92. The sensor chip 10 and the circuit chip 50 are housed in a space defined by the package 90

The sensor chip 10 includes the semiconductor substrate 11 having a front surface 11a. In the following description, a direction along the front surface 11a is referred to as an X-axis direction, a direction along the front surface 11a and perpendicular to the X-axis direction is referred to as a Y-axis direction, and a direction perpendicular to the X-axis direction and the Y-axis direction is referred to as a Z-axis direction. The X-axis direction corresponds to a first direction, the Y-axis direction corresponds to a second direction, and the Z-axis direction corresponds to a third direction.

Figure 2:
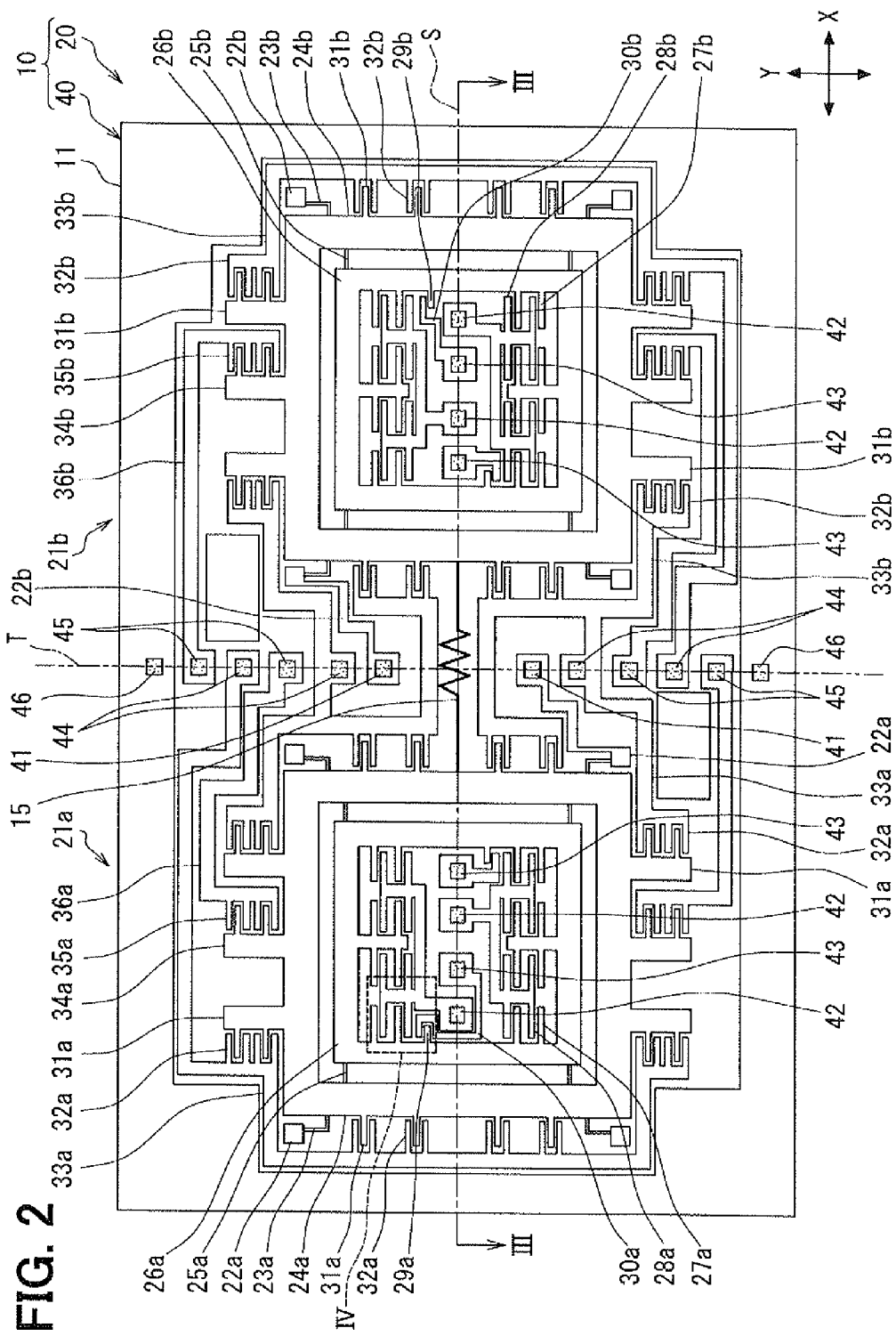
FIG. 2 is a plan view showing a sensor chip included in the angular velocity sensor.

In FIG. 2, a first virtual straight line S shown by a dashed-dotted line and extending along the X-axis direction bisects the sensor chip 10 in the Y-axis direction. A second virtual straight line T shown by a dashed-two dotted line and extending along the Y-axis direction bisects the sensor chip 10 in the X-axis direction.

Figure 3:
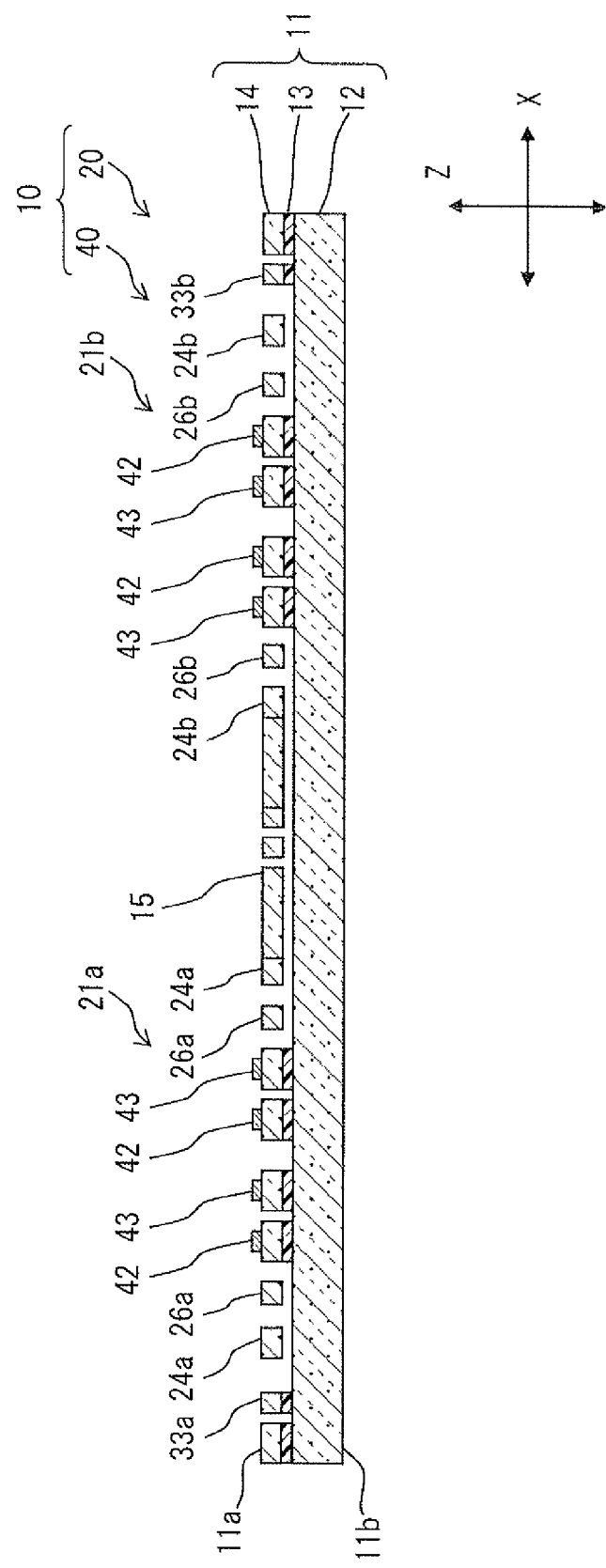
FIG. 3 is a cross-sectional view showing the sensor chip taken along line III-III in FIG. 2.

As shown in FIG. 2 and FIG. 3, the sensor chip 10 includes the semiconductor substrate 11, a sensor part 20 formed at a portion of the semiconductor substrate 11 adjacent to the front surface 11a, and a plurality of sensor pads 40 electrically coupled with the sensor part 20. The semiconductor substrate 11 is a silicon-on-insulator (SOI) substrate in which a first semiconductor layer 12, an insulating layer 13, and a second semiconductor layer 14 are stacked in this order. The sensor part 20 is formed at the portion of the semiconductor substrate 11 adjacent to the front surface 11a, that is, a portion of the semiconductor substrate 11 adjacent to the second semiconductor layer 14 by a known exposure technology. The sensor pads 40 are formed on predetermined portions of the second semiconductor layer 14. The second semiconductor layer 14 has a thickness "h" in a direction along the Z-axis direction.

The sensor part 20 mainly includes the second semiconductor layer 14. The second semiconductor layer 14 includes a fixed portion that is fixed to the first semiconductor layer 12 through the insulating layer 13 and a floating portion that floats above the first semiconductor layer 12 without through the insulating layer 13. The fixed portion is not movable with respect to the first semiconductor layer 12, and the floating portion is movable in the X-axis direction and the Y-axis direction with respect to the first semiconductor layer 12.

The sensor part 20 detects angular velocity. As shown in FIG. 2 and FIG. 3, the sensor part 20 includes a pair of detecting sections 21a, 21b. In FIG. 2, the detecting section 21a corresponds to a left portion of the sensor part 20 divided by the second virtual straight line T, and the detecting section 21b corresponds to a right portion of the sensor part 20 divided by the second virtual straight line T.

A configuration of the detecting section 21a will be described below. Because the detecting section 21a and the detecting section 21b have similar configurations, the configuration of the detecting section 21b will be described only about a correspondence relationship between the detecting section 21a and the detecting section 21b.

The detecting section 21a includes an anchor 22a, a first driving beam 23a, a driving frame 24a, a detecting beam 25a, a detecting frame 26a, a first detecting electrode 27a, a second detecting electrode 28a, a first servo electrode 29a, and a second servo electrode 30a, as main components for detecting angular velocity. The driving frame 24a is coupled with the anchor 22a through the first driving beam 23a. The detecting frame 26a is coupled with the driving frame 24a through the detecting beam 25a. The first detecting electrode 27a is disposed on the detecting frame 26a. The second detecting electrode 28a is located opposite to the first detecting electrode 27a. The first servo electrode 29a is disposed on the detecting frame 26a. The second servo electrode 30a is located opposite to the first servo electrode 29a.

The detecting section 21a includes a first driving electrode 31a, a second driving electrode 32a, and a second driving beam 33a as main components for driving the driving frame 24a. The first driving electrode 31a is disposed on the driving frame 24a. The second driving electrode 32a is disposed on the second driving beam 33a and is located opposite to the first driving electrode 31a.

The detecting section 21a includes a first monitoring electrode 34a, a second monitoring electrode 35a, and a monitoring beam 36a as components for monitoring a driving state of the driving frame 24a. The first monitoring electrode 34a is disposed on the driving frame 24a. The second monitoring electrode 35a is disposed on the monitoring beam 36a and is located opposite to the first monitoring electrode 34a.

The components 22a-36a in the detecting section 21a can be formed by etching the second semiconductor layer 14 and the insulating layer 13 with a mask pattern. In the components 22a-36a, the anchor 22a, the second detecting electrode 28a, the second servo electrode 30a, the second driving electrode 32a, the second driving beam 33a, the second monitoring electrode 35a, and the monitoring beam 36a are fixed to the first semiconductor layer 12 through the insulating layer 13. Thus, the anchor 22a, the second detecting electrode 28a, the second servo electrode 30a, the second driving electrode 32a, the second, driving beam 33a, the second monitoring electrode 35a, and the monitoring beam 36a are not movable with respect to the first semiconductor layer 12.

In the components 22a-36a, the first driving beam 23a, the driving frame 24a, the detecting beam 25a, the detecting frame 26a, the first detecting electrode 27a, the first servo electrode 29a, the first driving electrode 31a, and the first monitoring electrode 34a are floating with respect to the first semiconductor layer 12 because the insulating layer 13 located under the second semiconductor layer 14 is removed by sacrifice layer etching. Thus, the first driving beam 23a, the driving frame 24a, the detecting beam 25a, the detecting frame 26a, the first detecting electrode 27a, the first servo electrode 29a, the first driving electrode 31a, and the first monitoring electrode 34a are movable in the X-axis direction and the Y-axis direction with respect to the first semiconductor layer 12.

The anchor 22a holds the driving frame 24a through the first driving beam 23a. As shown in FIG. 2, the anchor 22a disposed at a center portion of the sensor part 20 has a first sensor pad 41. The first sensor pad 41 is applied with a direct-current (DC) voltage. The DC voltage is input to the driving frame 24a through the first driving beam 23a. The DC voltage is also input to the detecting frame 26a through the first driving beam 23a, the driving frame 24a, and the detecting beam 25a. Thus, the driving frame 24a and the detecting frame 24b are equipotential with the DC voltage.

The driving frame 24a vibrates in the X-axis direction by driving force $F_d$. The driving frame 24a has a frame shape having an outer periphery and an inner periphery. The first driving electrode 31a and the first monitoring electrode 34a protrude outward from the outer periphery of the driving frame 24a, and the first driving beam 23a is coupled with the outer periphery of the driving frame 24a. Because the driving frame 24a is equipotential with the DC voltage, the first driving electrode 31a and the first monitoring electrode 34a coupled with the driving frame 24a are equipotential with the DC voltage. The detecting beam 25a is coupled with the inner periphery of the driving frame 24a. The driving frame 24a and the detecting frame 26a are coupled with each other through the detecting beam 25a. Thus, the detecting frame 26a vibrates in the X-axis direction with vibration of the driving frame 24a in the X-axis direction.

The detecting frame 26a is disposed in a region surrounded by the driving frame 24a and is coupled with the driving frame 24a through the detecting beam 25a. Thus, the detecting frame 26a vibrates in the X-axis direction with vibration of the driving frame 24a in the X-axis direction. The detecting frame 26a has a frame shape having an outer periphery and an inner periphery. The detecting beam 25a is coupled with the outer periphery of the detecting frame 26a. The first detecting electrode 27a and the first servo electrode 29a protrude inward from the inner periphery of the detecting frame 24a. Because the detecting frame 26a is equipotential with the DC voltage as described above, the first detecting electrode 27a and the first servo electrode 29a disposed on the detecting frame 26a are equipotential with the DC voltage.

The second detecting electrode 28a is disposed in a region surrounded by the inner periphery of the detecting frame 26a. The second detecting electrode 28a is located opposite to the first detecting electrode 27a in the Y-axis direction. The second detecting electrode 28a has a second sensor pad 42. A capacitance change of a first capacitor $C_1$ provided by the first detecting electrode 27a and the second detecting electrode 28a is output from the second sensor pad 42.

The second servo electrode 30a is disposed in a region surrounded by the inner periphery of the detecting frame 26a. The second servo electrode 30a is located opposite to the first servo electrode 29a in the Y-axis direction. The second servo electrode 30a has a third sensor pad 43. The third sensor pad 43 is applied with a servo voltage based on an output signal from the second sensor pad 42. As described above, the first servo electrode 29a is equipotential with the DC voltage. Thus, electrostatic force (servo force $F_{SV}$) being proportional to a voltage depending on the DC voltage and the servo voltage is generated in a second capacitor $C_2$ provided by the first servo electrode 29a and the second servo electrode 30a. The servo force $F_{SV}$ is applied in the Y-axis direction so as to restrict vibration of the detecting frame 26a in the Y-axis direction. In the present embodiment, the servo voltage is detected as physical quantity for determining angular velocity.

The first driving electrode 31a and the second driving electrode 32a are provided for driving the first driving electrode 31a and the second driving electrode 32a. The second driving beam 33a on which the second driving electrode 32a is disposed has a fourth sensor pad 44. The fourth sensor pad 44 is applied with a driving voltage that has polarity changed with a predetermined period. As described above, the first servo electrode 29a is equipotential with the DC voltage. Thus, electrostatic force (driving force $F_d$) being proportional to a voltage depending on the DC voltage and the driving voltage is generated in a third capacitor $C_3$ provided by the first driving electrode 31a and the second driving electrode 32a. By the driving force $F_d$ along the X-axis direction, the driving frame 24a on which the first driving electrode 31a is disposed is displaced in the X-axis direction. Because the polarity of the driving voltage is changed with the predetermined period, an acting direction of the driving force $F_d$ applied to the first driving electrode 31a is changed in the X-axis direction in the predetermined period. Thus, the driving frame 24a on which the first driving electrode 31a is disposed vibrates in the X-axis direction with the predetermined period.

The first monitoring electrode 34a and the second monitoring electrode 35a are provided for monitoring the driving state (vibrating state) of the driving frame 24a. The monitoring beam 36a on which the second monitoring electrode 35a is disposed has a fifth sensor pad 45. A capacitance change of a fourth capacitor $C_4$ provided by the first monitoring electrode 34a and the second monitoring electrode 35a is output from the fifth sensor pad 45. Because the first monitoring electrode 34a is equipotential with the DC voltage, the second monitoring electrode 35a has a voltage depending on the DC voltage. In the present embodiment, the vibrating state of the driving frame 24a is monitored by monitoring the output signal of the second monitoring electrode 35a.

Next, the correspondence relationship between the detecting section 21a and the detecting section 21b will be described. The detecting section 21b includes an anchor 22b, a first driving beam 23b, a driving frame 24b, a detecting beam 25b, a detecting frame 26b, a first detecting electrode 27b, a second detecting electrode 28b, a first servo electrode 29b, a second servo electrode 30b, a first driving electrode 31b, a second driving electrode 32b, a second driving beam 33b, a first monitoring electrode 34a, a second monitoring electrode 35b, and a monitoring beam 36b. The anchor 22b corresponds to the anchor 22a. The first driving beam 23b corresponds to the first driving beam 23a. The driving frame 24b corresponds to the driving frame 24a. The detecting beam 25b corresponds to the detecting beam 25a. The detecting frame 26b corresponds to the detecting frame 26a. The first detecting electrode 27b corresponds to the first detecting electrode 27a. The second detecting electrode 28b corresponds to the second detecting electrode 28a. The first servo electrode 29b corresponds to the first servo electrode 29a. The second servo electrode 30b corresponds to the second servo electrode 30a. The first driving electrode 31b corresponds to the first driving electrode 31a. The second driving electrode 32b corresponds to the second driving electrode 32a. The second driving beam 33b corresponds to the second driving beam 33a. The first monitoring electrode 34b corresponds to the first monitoring electrode 34a. The second monitoring electrode 35b corresponds to the second monitoring electrode 35a. The monitoring beam 36b corresponds to the monitoring beam 36a.

As shown in FIG. 2, the second driving beam 33a and the second driving beam 33b disposed in the center portion of the sensor part 20 are integrated. The anchor 22b disposed in the center portion of the sensor part 20 has a first sensor pad 41. The second detecting electrode 28b has a second sensor pad 42. The first servo electrode 29b has a third sensor pad 43. The second driving beam 33b has a fourth sensor pad 44. The monitoring beam 36b has a fifth sensor pad 45.

The sensor pads 40 include sensor pads 41-46 for coupling the sensor chip 10 and the circuit chip 50 mechanically and electrically. The first sensor pads 41 are respectively disposed on the anchors 22a, 22b. The second sensor pads 42 are respectively disposed on the second detecting electrodes 28a, 28b. The third sensor pads 43 are respectively disposed on the second servo electrodes 30a, 30b. The fourth sensor pads 44 are respectively disposed on the second driving beams 33a and 33b. The fifth sensor pads 45 are respectively disposed, on the monitoring beams 36a and 36b. The sixth sensor pads 46 are disposed on portions of the second semiconductor layer 14 that are not etched with the mask pattern.

As described above, the DC voltage is input to each of the first sensor pads 41, the capacitance of the first capacitor $C_1$ is output from each of the second sensor pads 42, and the servo, voltage is input to each of the third sensor pads 43. The driving voltage is input to each of the fourth sensor pads 44, and the capacitance of the fourth capacitor $C_4$ is output from each of the fifth sensor pads 45. The sixth sensor pads 46 are applied with a constant voltage so that the sensor chip 10 has a constant potential.

Next, driving of the detecting section 21a and the detecting section 21b will be described. As shown in FIG. 2 and FIG. 3, the driving frame 24a is coupled with the anchor 22a through the first driving beam 23a, the driving frame 24b is coupled with the anchor 22b through the first driving beam 23b, and the driving frame 24a is coupled with the driving frame 24b through a coupling beam 15. Thus, the driving force $F_d$ generated at the first driving electrodes 31a, 31b and the second driving electrodes 32a, 32b enables coupled-vibration of the driving frame 24a and the driving frame 24b in the X-axis.

In order to vibrate the driving frame 24a and the driving frame 24b in opposite phase, driving voltages of inversion polarities are applied to the fourth sensor pads 44 that are shared by the second driving beams 33a, 33b located at the center portion and the fourth sensor pads 44 that are respectively disposed on the second driving beams 33a, 33b located in a right portion or a left portion of the sensor part 20. Accordingly, the driving force $F_d$ acting on the driving frame 24a and the driving force $F_d$ acting on the driving frame 24b act in opposite directions in the X-axis direction, and the driving frame 24a and the driving frame 24b vibrate in the opposite phases in the X-axis direction.

As described above, the detecting frame 26a is coupled with the driving frame 24a through the detecting beam 25a. The detecting frame 26b is coupled with the driving frame 24b through the detecting beam 25b. Thus, when the driving frame 24a and the driving frame 24b vibrates in the opposite phases in the X-axis direction, the detecting frame 26a and the detecting frame 26b also vibrates in the opposite phases in the X-axis direction.

When the angular velocity sensor 100 is applied with angular velocity in the Z-axis direction in a state where the detecting frame 26a and the detecting frame 26b vibrate in the opposite phases in the X-axis direction, Coriolis force $F_C$ in the Y-axis direction is generated at each of the detecting frames 26a, 26b. When each of the detecting frames 26a, 26b is displaced in the Y-axis direction by the Coriolis force $F_C$, the first detecting electrode 27a coupled with the detecting frame 26a and the first detecting electrode 27b coupled with the detecting frame 26b are also displaced in the Y-axis direction. Accordingly, the distance between the first detecting electrode 27a and the second detecting electrode 28a and the distance between the first detecting electrode 27b and the second detecting electrode 28b change, and the capacitances of the first capacitors $C_1$ change. The changes in capacitances are input to the circuit chip 50 through the second sensor pads 42 disposed on the second detecting electrodes 28a, 28b, the bumps 70, and circuit pads 54 disposed on the circuit chip 50.

The circuit chip 50 calculates the servo voltage to restrict vibration of the detecting frames 26a, 26b in the Y-axis direction based on the changes in capacitances. The calculated servo voltage is input to the second servo electrodes 30a, 30b through the circuit pads 54, the bumps 70, and the third sensor pads 43. Accordingly, the servo forces $F_{SV}$ to restrict vibration of the detecting frames 26a, 26b in the Y-axis direction are generated at the second capacitor $C_2$ provided by the first servo electrode 29a and the second servo electrode 30a and the second capacitor $C_2$ provided by the first servo electrode 29b and the second servo electrode 30b. As a result, the detecting frames 26a, 26b are restricted from vibrating in the Y-axis direction.

An acting direction of Coriolis force $F_C$ depends on a vibrating direction. Because the detecting frame 26a and the detecting frame 26b vibrates in the opposite phases in the X-axis direction, Coriolis force $F_C$ acting on the detecting frame 26a and Coriolis force $F_C$ acting on the detecting frame 26b act in the opposite directions. Thus, increase and decrease of the capacitance of the third capacitor $C_3$ provided by the first detecting electrode 27a and the second detecting electrode 28a is opposite to increase and decrease of the capacitance of the third capacitor $C_3$ provided by the first detecting electrode 27b and the second detecting electrode 28b. In other words, when the capacitance of one of the third capacitors $C_3$ increases, the capacitances of the other of the third capacitors $C_3$ decreases. By calculating the difference between the capacitances of the two third capacitors $C_3$, capacitance depending on angular velocity can be detected. The calculation of the difference is performed by the circuit chip 50.

The circuit chip 50 includes a semiconductor substrate 51 having a surface 51a. On the surface 51a, a circuit part 52 and the pads 53 are disposed. The circuit part 52 processes the output signals of the sensor chip 10, and the pads 53 are electrically coupled with the circuit part 52. The pads 53 include the circuit pads 54 corresponding to the sensor pads 40 and outer pads 55 electrically coupled with the wires 92. The circuit part 52 also inputs control signals to the sensor chip 10. The control signals include the DC voltages, the driving voltages, the servo voltages, and the constant voltages.

The package 90 includes a housing 93 and a lid 94. The housing 93 has an opening portion 93a. The lid 94 covers the opening portion 93a. On a bottom inner surface of the housing 93, the adhesive 91 is disposed. The housing 93 and the circuit chip 50 are mechanically coupled through the adhesive 91. The housing 93 includes inner terminals 95, inner wires 96, and outer terminals 97. The inner terminals 95 are disposed in inner surface of sidewalls of the housing 93. The inner wires 96 are disposed on the inner surface the sidewalls of the housing 93. The outer terminals 97 are disposed on an outer surface of the bottom of the housing 93. The inner terminals 95 and the outer pads 55 of the circuit chip 50 are electrically coupled through the wires 92. Thus, electrical signals of the circuit chip 50 can be output to an external device through the outer pads 55, the wires 92, the inner terminals 95, the inner wires 96, and the outer terminals 97. The housing 93 and the lid 94 are coupled with each other mechanically and electrically.

Figure 4:
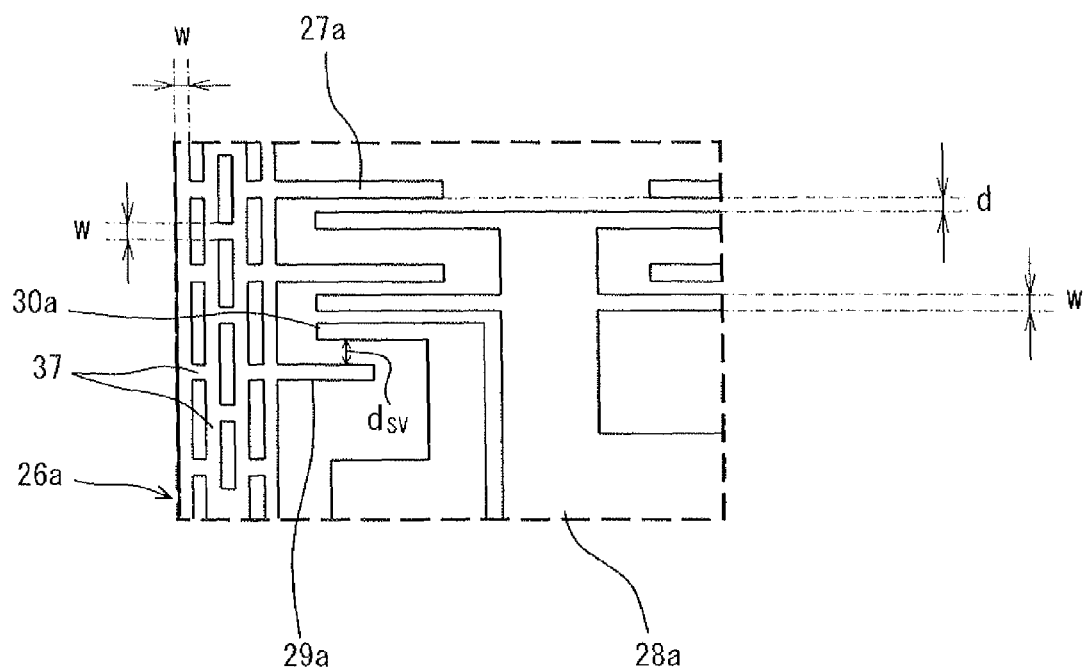
FIG. 4 is an enlarged view of a part of the sensor chip surround by dashed line IV in FIG. 2.

Next, dimensions of the detecting frame 26a, the first detecting electrode 27a, the second detecting electrode 28a, the first servo electrode 29a, and the second servo electrode 30a in the angular velocity sensor 100 according to the present embodiment will be described with reference to FIG. 4. The detecting frame 26a includes a plurality of unit elements 37. Each of the unit elements 37 has a unit width "w" in the X-axis direction or the Y-axis direction. The unit elements 37 are integrated in a lattice pattern and form the frame shape. The first detecting electrode 27a protrudes inward from the inner periphery of the detecting frame 26a. A width of the first detecting electrode 27a in the Y-axis direction is also "w." A width of a portion (a portion extending in the X-axis direction) of the second detecting electrode 28a located opposite to the first detecting electrode 27a is also "w." The first detecting electrode 27a and the second detecting electrode 28a are opposite to each other in the Y-axis direction at electrode intervals "d." The first servo electrode 29a and the second servo electrode 30a are opposite to each other in the Y-axis direction at electrode intervals $d_{SV}$. In the present embodiment, the electrode interval $d_{SV}$ is twice the width "w."

The driving frame 24a includes a plurality of unit elements 37 similarly to the detecting frame 26a, and the unit elements 37 are integrated in a lattice pattern and form the frame shape. In the detecting section 21b, each component has the same dimension as the corresponding component in the detecting section 21a.

The servo voltage is calculated based on the change in capacitance of the first capacitor $C_1$ provided by the first detecting electrode 27a and the second detecting electrode 28a and the change in capacitance of the first capacitor $C_1$ provided by the first detecting electrode 27b and the second detecting electrode 28b. The calculated servo voltage is applied to each of the second servo electrodes 30a, 30b. Accordingly, the servo force $F_{SV}$ that restricts displacement of the detecting frame 26a in the Y-axis direction is generated in the second capacitor $C_2$ provided by the first servo electrode 29a and the second servo electrode 30a, and the servo force $F_{SV}$ that restricts displacement of the detecting frame 26b in the Y-axis direction is generated in the second capacitor $C_2$ provided by the first servo electrode 29b and the second servo electrode 30b. A change in the servo force $F_{SV}$ with respect to a change in angular velocity, that is, a change in the servo voltage with respect to a change in angular velocity (hereafter, referred to as a servo sensitivity $S_{SV}$) is desired to be high. When the electrode interval $d_{SV}$ and the width "w" of the first detecting electrode 27a and the second detecting electrode 28a vary widely, that is, when a line width variation is large, the servo sensitivity $S_{SV}$ may be reduced. In the present embodiment, the electrode interval $d_{SV}$ is twice the width "w" so that influence of variation in the electrode interval $d_{SV}$ and the width "w" the servo sensitivity $S_{SV}$ is reduced. A process of deriving the above-described relationship will be described below.

When the Coriolis force per angular velocity is $f_C$ and the servo voltage per voltage is $f_{SV}$, the servo sensitivity $S_{SV}$ can be calculated according to the following expression (1).

$$S_{SV} = \frac{f_C}{f_{SV}} \quad (1)$$

The unit of the Coriolis force per angular velocity is N/(deg/s) and the unit of the servo force $f_{SV}$ per voltage is N/V. Thus, the unit of the servo sensitivity $S_{SV}$ is V/(deg/s). In this way, the servo sensitivity $S_{SV}$ indicates the servo voltage per angular velocity, that is, the change in servo voltage with respect to the change in angular velocity. The servo sensitivity $S_{SV}$ satisfies the following expression (2). Thus, the servo sensitivity $S_{SV}$ is calculated after the Coriolis force $F_C$ and the servo force $F_{SV}$ are calculated in order.

$$S_{SV} \propto \frac{F_C}{F_{SV}} \quad (2)$$

As described above, when the angular velocity sensor 100 is applied with angular velocity in the Z-axis direction in a state where the detecting frame 26a and the detecting frame 26b vibrate in the opposite phases in the X-axis direction, the Coriolis force $F_C$ in the Y-axis direction is generated in each of the detecting frames 26a, 26b. When each of the detecting frames 26a, 26b has mass "m," each of detecting frames 26a, 26b has vibration velocity $V_d$ in the X-axis direction, and the angular velocity in the Z-axis direction is Ω, the Coriolis force $F_C$ can be calculated according to the following expression (3).

$$F_C = 2mV_d\Omega \quad (3)$$

As described above, each of the detecting frames 26a, 26b vibrates in the X-axis direction. Thus, when amplitude is $X_d$, angular velocity is $\omega_d$, and time is "t," the phase X of each of the detecting frames 26a, 26b can be calculated according to the following expression (4).

$$X = X_d \sin \omega_d t \quad (4)$$

Thus, the vibration velocity $V_d$ in the expression (3) can be calculated according to the following expression (5).

$$V_d = X_d \omega_d \cos \omega_d t \quad (5)$$

When a frequency in the X-axis direction, that is, a driving frequency is $f_d$, the angular velocity $\omega_d$ can be expressed as $\omega_d = 2\pi f_d$. Thus, the expression (3) can be modified into the following expression (6).

$$F_C = 2m \cdot X_d 2\pi f_d \cos \omega_d t \cdot \Omega \quad (6)$$

The driving frame 24a is coupled with the anchor 22a through the first driving beam 23a, the driving frame 24b is coupled with the anchor 22b through the first driving beam 23b, and the driving frame 24a is coupled with the driving frame 24b through the coupling beam 15. The driving frame 24a and the driving frame 24b vibrate in the X-axis direction due to the driving force $F_d$ generated in each of the driving electrodes 31a, 32a and the driving electrodes 31b, 32b. The detecting frame 26a is coupled with the driving frame 24a through the detecting beam 25a, and the detecting frame 26b is coupled with the driving frame 24b through the detecting beam 25b. The detecting frame 26a vibrates in the X-axis direction due to spring force of the detecting beam 25a, and the detecting frame 26b vibrates in the X-axis direction due to spring force of the detecting beam 25b. Thus, when each of the detecting beams 25a, 25b has a spring constant $k_d$, and Q-value in the X-axis direction is $Q_d$, the following expression (7) is obtained.

$$F_d \cdot Q_d = k_d X_d \quad (7)$$

Accordingly, the amplitude $X_d$ can be expressed with the driving force $F_d$, the spring constant $k_d$, and the Q-value $Q_d$, and the expression (6) can be modified into the following expression (8).

$$F_C = 2m \cdot \frac{F_d}{k_d} Q_d \cdot 2\pi f_d \cdot \cos\omega_d t \cdot \Omega \qquad (8)$$

The driving frequency $f_d$ can be expressed by the following expression (9).

$$f_d = \frac{1}{2\pi}\sqrt{\frac{k_d}{m}} \qquad (9)$$

Furthermore, when a shear damping in the X-axis direction is $\sigma_d$, the Q-value $Q_d$ can be expressed by the following expression (10).

$$Q_d = \frac{\sqrt{mk_d}}{\sigma_d} \qquad (10)$$

Thus, the expression (8) can be modified into the following expression (11).

$$F_C = 2m \cdot \frac{F_d}{k_d} \cdot \frac{\sqrt{mk_d}}{c_d} \cdot 2\pi \cdot \frac{1}{2\pi} \cdot \frac{1}{2\pi}\sqrt{\frac{k_d}{m}} \cos\omega_d t \cdot \Omega \qquad (11)$$

When the expression (11) is organized, the Coriolis force $F_C$ can be expressed by the following expression (12).

$$F_C = 2m\frac{F_d}{c_d} \cdot \cos\omega_d t \cdot \Omega \qquad (12)$$

The Coriolis force $F_C$ satisfies the following expression (13).

$$F_C \propto m\frac{F_d}{c_d} \qquad (13)$$

Each of the detecting frames 26a, 26b are floating with respect to the first semiconductor layer 12 because the insulating layer 13 located under the second semiconductor layer 14 is removed. Thus, the thickness of each of the detecting frames 26a, 26b in the Z-axis direction is equal to the thickness "h" of the second semiconductor layer 14. Each of the detecting frames 26a, 26b is configured by the unit elements 37 having the width "w." Thus, mass "m" per unit length in the X-axis direction satisfies a proportional relationship indicated by the following expression (14).

$$m \propto h \cdot w \qquad (14)$$

The driving force $F_d$ is equal to electrostatic force generated in the third capacitor $C_3$ provided by the first driving electrode 31a and the second driving electrode 32a or the third capacitor $C_3$ provided by the first driving electrode 31b and the second driving electrode 32b. The first driving electrode 31a and the second driving electrode 32a vibrate in the X-axis direction while maintaining the opposing interval, and the first driving electrode 31b and the second driving electrode 32b vibrate in the X-axis direction while maintaining the opposing interval. Thus, when the third capacitor $C_3$ has capacitance $C_d$, the driving force $F_d$ satisfies a proportional relationship indicated by the following expression (15).

$$F_d \propto C_d \qquad (15)$$

Each of the opposing area of the first driving electrode 31a and the second driving electrode 32a per unit length in the X-axis direction and the opposing area of the first driving electrode 31b and the second driving electrode 32b per unit length in the X-axis direction is "h." Thus, when the electrode interval of the third capacitor $C_3$ is $d_d$, the driving force $F_d$ per unit length in the X-axis direction satisfies a proportional relationship indicated by the following expression (16).

$$F_d \propto \frac{h}{d_d} \qquad (16)$$

The shear damping $\sigma_d$ is proportional to the opposing area of the third capacitor $C_3$ and is inversely proportional to the electrode interval $d_d$. Because the opposing area of the first driving electrode 31a and the second driving electrode 32a and the opposing area of the first driving electrode 31b and the second driving electrode 32b are "h," the shear damping $\sigma_d$ per unit length in the X-axis direction satisfies a proportional relationship indicated by the following expression (17).

$$\sigma_d \propto \frac{h}{d_d} \qquad (17)$$

Thus, the expression (13) can be rewritten as the following expression (18).

$$F_C \propto hw \cdot \frac{h}{d_d} \cdot \left(\frac{h}{d_d}\right)^{-1} \qquad (18)$$

By organizing the expression (18), it turns out that the Coriolis force $F_C$ satisfies a proportional relationship indicated by the following expression (19).

$$F_C \propto hw \qquad (19)$$

The servo force $F_{SV}$ is equal to electrostatic force generated in the second capacitor $C_2$ provided by the first servo electrode 29a and the second servo electrode 30a or the second capacitor $C_2$ provided by the first servo electrode 29b and the second servo electrode 30b. The first servo electrode 29a and the second servo electrode 30a vibrate in the Y-axis direction while changing the opposing interval, and the first servo electrode 29b and the second servo electrode 30b vibrate in the Y-axis direction while changing the opposing interval. Thus, when the second capacitor $C_2$ has capacitance $C_{SV}$, the servo force $F_{SV}$ satisfies a proportional relationship indicated by the following expression (20).

$$F_{SV} \propto \frac{C_{SV}}{d_{SV}} \qquad (20)$$

Each of the first servo electrodes 29a, 29b are floating with respect to the first semiconductor layer 12 because the insulating layer 13 located under the second semiconductor layer 14 is removed. Thus, the thickness of each of the first servo electrodes 29a, 29b in the Z-axis direction is equal to the thickness "h" of the second semiconductor layer. Thus, each of the opposing area of the first servo electrode 29a and the second servo electrode 30a per unit length in the X-axis direction and the opposing area of the first servo electrode 29b and the second servo electrode 30b per unit length in the X-axis direction is "h." Because the capacitance $C_{SV}$ is proportional to the opposing area and is inversely proportional to the electrode interval $d_{SV}$, the servo force $F_{SV}$ per unit length in the X-axis direction satisfies a proportional relationship indicated by the following expression (21).

$$F_{SV} \propto \frac{h}{d_{SV}^2} \quad (21)$$

When the Coriolis force $F_C$ indicated by the expression (19) and the servo force $F_{SV}$ indicated by the expression (22) are substituted in the expression (2), the expression (2) satisfies a proportional relationship indicated by the following expression (22).

$$S_{SV} \propto \frac{hw}{\frac{h}{d_{SV}^2}} \quad (22)$$

By organizing the expression (22), it turns out that the servo sensitivity $S_{SV}$ satisfies a proportional relationship indicated by the following expression (23).

$$S_{SV} \propto w \cdot d_{SV}^2 \quad (23)$$

When the variation in each of the electrode interval $d_{SV}$ and the width "w" is indicated by $\Delta d$ the expression (23) can be modified into the following expression (24).

$$S_{SV} \propto (w \pm \Delta d) \cdot (d_{SV}^2 \pm \Delta d)^2 \quad (24)$$

By differentiating the servo sensitivity $S_{SV}$ with the variation $\Delta d$, the following expression (25) is obtained.

$$\frac{\partial S_{SV}}{\partial \Delta d} \propto \Delta d^3 + (w + 2 d_{SV}) \Delta d^2 + (2 d_{SV} w + d_{SV}^2) \Delta d \quad (25)$$

Each of $\Delta d^3$ and $\Delta d^2$ is much smaller than $\Delta d$ and is close to zero. Thus, $\partial S_{SV}/\partial \Delta d$ becomes the minimum, that is, the influence of the line width variation on the servo sensitivity $S_{SV}$ becomes the minimum with a condition that a coefficient of $\Delta d$ is zero. The condition can be indicated by the following expression (26).

$$d_{SV} = -2w \quad (26)$$

As described above, when the electrode interval $d_{SV}$ is twice the width "w" of the first detecting electrodes 27a, 27b and the second detecting electrodes 28a, 28b, the influence of the line width variation on the servo sensitivity $S_{SV}$ becomes the minimum. In the angular velocity sensor 100 according to the present embodiment, the electrode interval $d_{SV}=2w$. Thus, the influence of the line wave variation on the servo, sensitivity $S_{SV}$ can be the minimum. Therefore, the angular velocity sensor 100 can have a high servo sensitivity $S_{SV}$ and can have a high detection accuracy of angular velocity.

Figure 5:
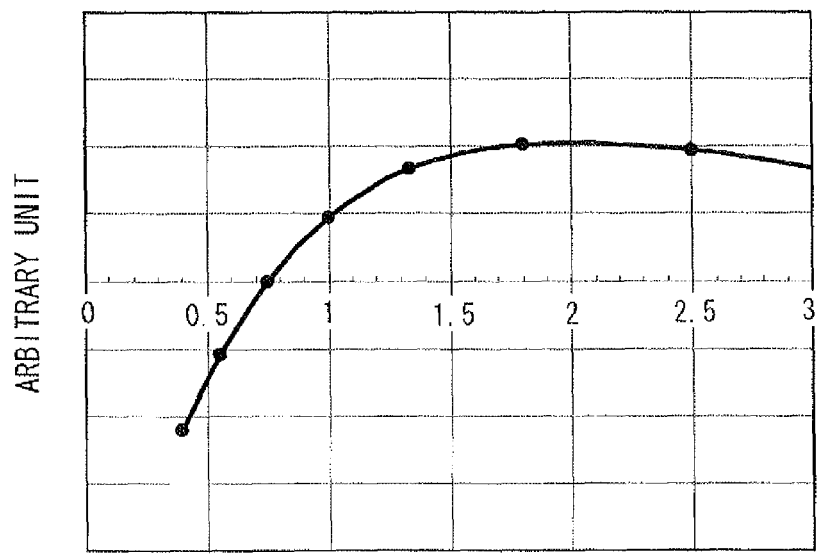
FIG. 5 is a graph showing a servo sensitivity.

As reference, the servo sensitivity $S_{SV}$ having variable $d_{SV}/w$ is shown in FIG. 5. As shown in FIG. 5, the servo sensitivity $S_{SV}$ becomes the maximum value when $d_{SV}/w=2$, that is, $d_{SV}=2w$. The vertical axis of the graph shown in FIG. 5 is an arbitrary unit.

Although the present invention has been fully described in connection with the exemplary embodiments thereof with reference to the accompanying drawings, it is to be noted that various changes and modifications will become apparent to those skilled in the art.

In the above-described embodiment, when the expression (14) is derived, it is described that the mass "m" per unit length in the X-axis direction is proportional to "hw" because each of the detecting frames 26a, 26b is configured by the unit elements 37. However, even when each of the detecting frames 26a, 26b is not configured by the unit elements 37, mass can be indicated as a real number times fundamental mass. Therefore, it can be described that the mass "m" per unit length in the X-axis direction is proportional to "hw" even when each of the detecting frames 26a, 26b is not configurated by the unit elements 37.

The driving frames 24a, 24b can function as vibrators. The first servo electrodes 29a, 29b and the second servo electrodes 30a, 30b are included in a restricting portion. The first driving electrodes 31a, 31b, the second driving electrodes 32a, 32b, and the driving beams 33a, 33b are included in a driving portion. The first monitoring electrodes 34a, 34b, and the monitoring beams 36a, 36b are included in a monitoring portion.

What is claimed is:

1. An angular velocity sensor comprising:
a substrate;
a pair of vibrators;
a beam portion coupling the pair of vibrators with each other and coupling each of the pair of vibrators to the substrate to enable the pair of vibrators to be movable in a first direction and a second direction that are perpendicular to each other;
a driving portion configured to vibrate the pair of vibrators in opposite phases in the first direction, the driving portion including a first driving electrode disposed on each of the pair of vibrators and a second driving electrode disposed on the substrate, the first driving electrode and the second driving electrode located opposite to each other in the second direction;
a detecting portion configured to detect displacement of the pair of vibrators in the second direction as a change in capacitance, the displacement of the pair of vibrators in the second direction being caused by Coriolis force generated in the pair of vibrators due to vibration of the pair of vibrators and angular velocity around a third direction that is perpendicular to the first direction and the second direction, the detecting portion including a first detecting electrode disposed on each of the pair of vibrators and a second detecting electrode disposed on the substrate, the first detecting electrode and the second detecting electrode located opposite to each other in the second direction; and
a restricting portion configured to restrict displacement of each of the pair of vibrators in the second direction based on the change in capacitance, the restricting portion including a first restricting electrode disposed on each of the pair of vibrators and a second restricting electrode disposed on the substrate, the first restricting electrode and the second restricting electrode located opposite to each other in the second direction, wherein
the first driving electrode, the second driving electrode, the first detecting electrode, the second detecting electrode, the first restricting electrode, and the second restricting electrode have a same thickness in the third direction,
the first detecting electrode includes a first opposing portion located opposite to the second detecting electrode, the second detecting electrode includes a second opposing portion located opposite to the first detecting electrode, and the first opposing portion and the second opposing portion have a same width in the second direction, and the first restricting electrode is located at an electrode interval from the second restricting electrode in the second direction, and the electrode interval is twice the width of each of the first opposing portion and the second opposing portion.

2. The angular velocity sensor according to claim 1, wherein:

each of the pair of vibrators includes a driving frame having a frame shape and a detecting frame surrounded by the driving frame and having a frame shape;

each of the driving frame and the detecting frame includes a plurality of unit elements integrated in a lattice pattern; and each of the plurality of unit elements has a unit width that is equal to the width of each of the first opposing portion and the second opposing portion.

3. The angular velocity sensor according to claim 2, wherein:

the beam portion includes a driving beam, a detecting beam, and a coupling beam;

the driving beam couples the substrate and the driving frame, the detecting beam couples the driving frame and the detecting frame, and the coupling beam couples the driving frame of one of the pair of vibrators and the driving frame of the other of the pair of vibrators; and the first driving electrode is disposed on an outer periphery of the driving frame, the second driving electrode is disposed in a portion of the substrate outside the driving frame, the first detecting electrode and the first restricting electrode are disposed on an inner periphery of the detecting frame, and the second detecting electrode and the second restricting electrode are disposed in a portion of the substrate surrounded by the inner periphery of the detecting frame.

4. The angular velocity sensor according to claim 2, further comprising a monitoring portion configured to monitor a vibrating state of the driving frame, the monitoring portion including a first monitoring electrode disposed on the driving frame of each of the pair of vibrators and a second monitoring electrode disposed opposite to the first monitoring electrode in the second direction.

5. The angular velocity sensor according to claim 3, further comprising a monitoring portion configured to monitor a vibrating state of the driving frame, the monitoring portion including a first monitoring electrode disposed on the driving frame of each of the pair of vibrators and a second monitoring electrode disposed opposite to the first monitoring electrode in the second direction.

* * * * *